United States Patent
Audityan et al.

(10) Patent No.: US 6,847,990 B2
(45) Date of Patent: Jan. 25, 2005

(54) DATA TRANSFER UNIT WITH SUPPORT FOR MULTIPLE COHERENCY GRANULES

(75) Inventors: Srinath Audityan, Austin, TX (US); Marie J. Sullivan, Leander, TX (US); Jose M. Nunez, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 428 days.

(21) Appl. No.: 10/150,671

(22) Filed: May 17, 2002

(65) Prior Publication Data

US 2003/0217232 A1 Nov. 20, 2003

(51) Int. Cl.⁷ .............................................. G06F 13/28
(52) U.S. Cl. ..................................................... 709/212
(58) Field of Search ............................ 709/212; 710/22

(56) References Cited

U.S. PATENT DOCUMENTS

| 5,590,378 A | 12/1996 | Thayer et al. |
| 5,812,876 A | 9/1998 | Welker et al. |
| 5,953,538 A * | 9/1999 | Duncan et al. ............... 710/22 |
| 2003/0159005 A1 * | 8/2003 | Augsburg et al. ........... 711/146 |

FOREIGN PATENT DOCUMENTS

EP 0392657 A1 10/1990

OTHER PUBLICATIONS

"Harrier Application Specific Integrated Circuit (ASIC," Programmer's Reference Guide, Parts 1 and 2, May 2001, 41 pgs.

PCT International Search Report PCT/US03/13711.

* cited by examiner

*Primary Examiner*—Kevin Verbrugge
(74) *Attorney, Agent, or Firm*—James L. Clingan, Jr.; Joanna G. Chiu

(57) ABSTRACT

A data transfer unit is able to read data from a source at the source coherency granule size and write data at the destination coherency granule size even though the two granule sizes may be different. A data transfer unit has registers for storing the granule size information in preparation of performing a transfer of a data block between a source and a destination. The data block is transferred in sub-blocks. Except for the first and last sub-blocks, the sub-blocks, for a read, are sized to the source coherency granule size, which is the transfer size that has been optimized for the source. For the write, the sub-blocks are sized to the destination coherency granule size, which is the transfer size that has been optimized for the destination. Thus, both the read and the write are optimized even though the transfers themselves are among devices with different coherency granules.

26 Claims, 4 Drawing Sheets

US 6,847,990 B2

DATA TRANSFER UNIT WITH SUPPORT FOR MULTIPLE COHERENCY GRANULES

FIELD OF THE INVENTION

This invention relates to data transfer units, especially direct memory access (DMA) units, and more particularly to data transfer units that transfer data according to system requirements.

RELATED ART

In data processing systems it is typical to define rules relative to data transfers for optimizing the overall system considerations. One such consideration is to define coherency granules that relate to units of data that are stored in memory. These units generally have a close relationship to caches that may be used in the system. The caches are utilized to improve system performance. One aspect of this is that when a cache access is performed, not just the requested data is fetched but additional data as well. This is done due to performance related to the cache hardware and anticipation of the likely next accesses. The amount of total data that is collected in response to the request is generally called a cache line. In such a case, the cache line and the coherency granule are the same, which is the typical case.

The hardware is designed with the assumption that coherency granules will be the data packets that are typically transferred in a coherent system when accessing coherent data. The magnitude of the coherency granule is typically significantly greater than the bus size. For example, in current processing systems, the coherency granule is commonly 32 bytes, and the bus size is 8 bytes wide. In such a case, a data transfer of one coherency granule requires 4 cycles on the bus. The hardware is designed to optimize, for example by using burst techniques, the performance of such transfers. Thus a burst transfer of a coherency granule will take less time than two transfers each of a half of a coherency granule.

As systems continue to get more and more complex, there has been a tendency to increase the size of coherency granules. As the size of coherency granules increases, there is thus more data per coherency granule. This can make it more complicated since more data must be dealt with for each operation that must maintain the requirements of the coherency associated with the data.

Thus, there is a need for a technique for providing data transfers while maintaining good performance and the coherency requirements in the context of coherency granules.

BRIEF DESCRIPTION OF THE DRAWINGS

The present invention is illustrated by way of example and not limited by the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

A data transfer unit, typically a direct memory access (DMA) controller, is operable to transfer a data block between devices of differing coherency granule sizes wherein a coherency granule is the unit of data for which coherency status is maintained in a cache. This is achieved by the DMA controller that is operating as the master knowing the coherency granule sizes of the source and target devices of the transfer. For example, the source transfers to the target the data in sub-blocks that are the size of the target's coherency granule size instead of the source's coherency granule size. The invention is better understood with reference to the figures and the description thereof.

Figure 1:
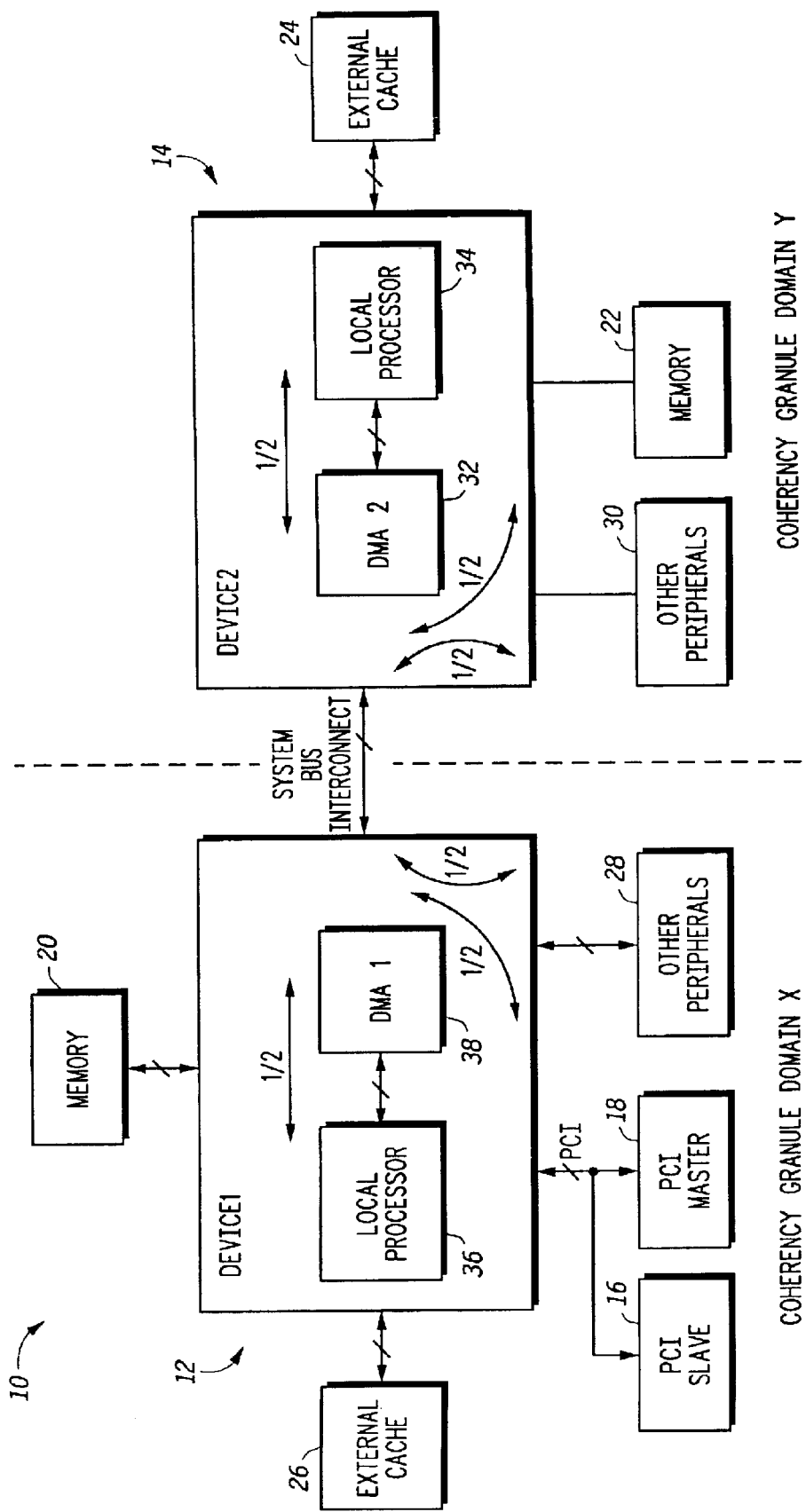
FIG. 1 is a block diagram of a system having multiple devices with different coherency requirements according to a preferred embodiment of the invention.

Shown in FIG. 1 is a system 10 having a device 12 having a first coherency granule size associated with it, a device 14 having a second coherency granule size associated with it and coupled to device 12 by a system bus interconnect, a PCI slave 16 coupled to device 12, a PCI master 18 coupled to device 12, a memory 20 coupled to device 12, a memory 22 coupled to device 14, an external cache 24 coupled to device 14, an external cache 26 coupled to device 12, other peripherals 28 coupled to device 12, an external cache 26 coupled to device 14, and other peripherals 30 coupled to device 14. Device 12 comprises a local processor 36 and a DMA controller 38. Device 14 comprises a local processor 34 and a DMA controller 32. Devices 12 and 14 each having support for multiprocessing. These elements shown in FIG. 1 could be considered prior art except for the differing coherency granule sizes of devices 12 and 14 and some unique characteristics of DMA controllers 38 and/or 32.

In operation devices 12 and 14 function in a coordinated fashion to achieve a desired performance as programmed. In this process, a variety of operations are performed. One type of operation is a data transfer of a data block controlled by one of DMA controllers 32 or 38. The data block can go from any of the memory resources to any other memory resource and such resources include the peripherals. Each of these peripherals and memory resources has a predetermined memory space that is visible to the system programmer. An example of such a data transfer is a data transfer between external cache 26, the source, and external cache 24, the destination, via the system bus interconnect. Each of DMA controllers 32 and 38 is designed to read from and write to resources according to the coherency size of the resources of the system that it is part of. In the present case then, first assume that the first coherency granule size, the coherency granule size of device 12, is 32 bytes and the second coherency granule size, the coherency granule size of device 14, is 64 bytes. For the case in which DMA controller 38 is operating as the master, DMA controller 38 ensures that the data block, to the extent reasonably possible, is read in sub-blocks of 32 bytes from external cache 26 under the control of device 12 and written in blocks of 64 bytes across the system bus interconnect to external cache 24 under the control of device 14.

Figure 2:
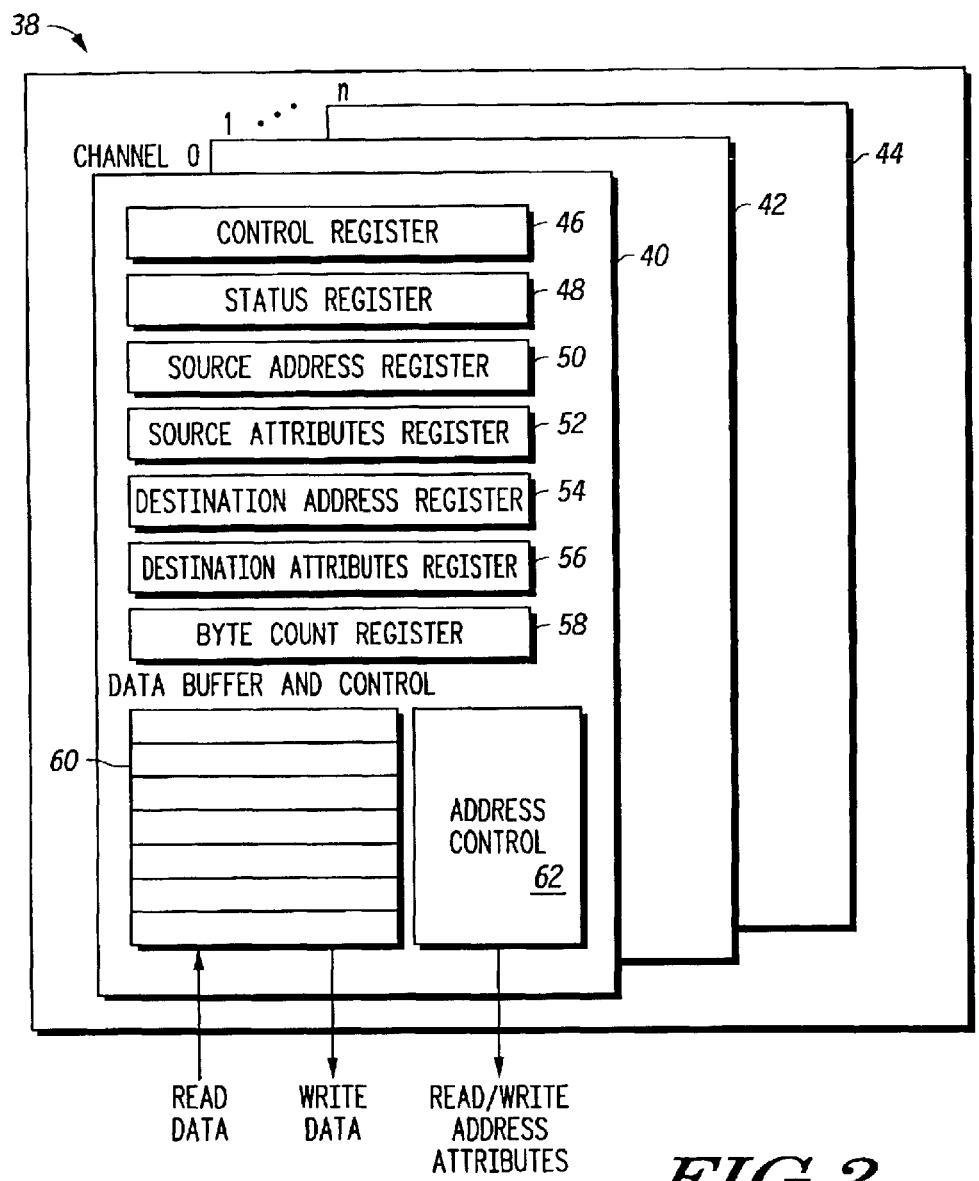
FIG. 2 is a more detailed diagram of a data transfer device of the system of FIG. 1 according to the preferred embodiment of the invention.

Shown in FIG. 2 is a diagram of DMA controller 38 comprising a channel 40, a channel 42, and channel 44.

Controller 32 can be diagrammed in a similar manner. Each of these channels 40–44 can be considered to be a data transfer engine. A DMA controller such as DMA controller 38 could have many more channels. The number of channels typically is in the range of 4 to 16, but may be fewer than that or more than that. Channel 40 comprises a control register 46, a status register 48, source address register 50, a source attributes register 52, a destination address register 54, a destination attributes register 56, a byte count register 58, a data buffer and control 60, and an address control 62. These registers are all conventional except for certain aspects of source attributes register 52 and the destination attributes register 56. Typical channels of a DMA controller have a data buffer and control but the buffer may be just the size of the coherency granule of the device whereas in FIG. 2, the buffer size of data buffer and control 60 is at least double and preferably eight times the coherency granule size of device 12. Thus, buffer and control 60 has a buffer large enough to be able to write data in sub-blocks coherency granules that are up to eight times the size of that of the coherency granule size of device 12.

Figure 3:
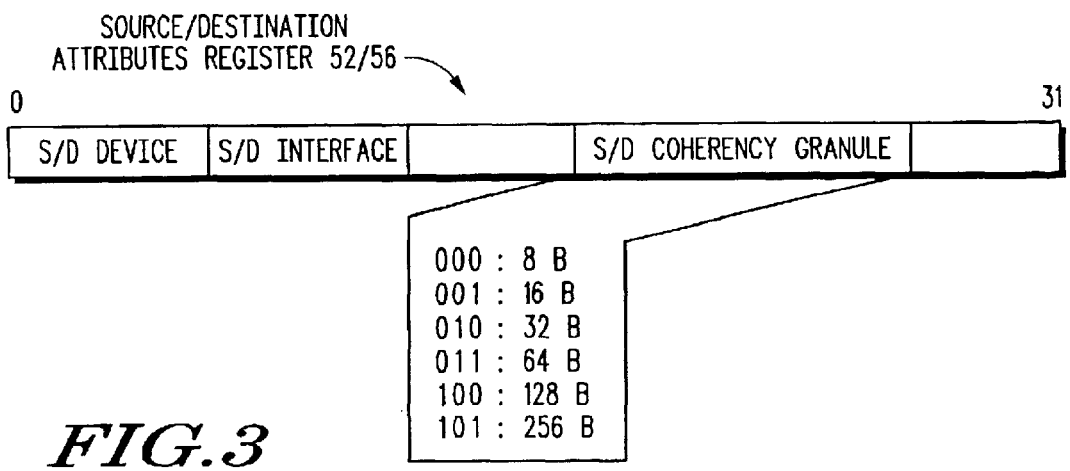
FIG. 3 is a more detailed diagram of a portion of the data transfer device of FIG. 2.

FIG. 3 shows a more detailed 32-bit source or destination attributes register 52 or 56 of which three bits, which are user programmable, are dedicated to identifying the size of the coherency granule of the source or destination. If DMA controller 38 is operating as the data transfer unit, then the coherency granule size of the source will be contained in source attributes register 52 and the coherency granule size of the destination will be contained in destination attributes register 56. Thus, DMA controller 38 can send the data present at the source to the destination within a sub-block transfer that matches the size of the coherency granule of the destination. The buffer size of data and buffer control 60 allows for accumulation of data until the amount of data matches the coherency granule size of the destination for the case where the source coherency granule size is smaller than the destination. Similarly, if the source coherency granule size is larger than that of the destination, data buffer and control 60 sends a block that matches the destination coherency granule size, holds the remainder in the buffer, and then continues sending sub-blocks from the buffer. Thus, data buffer and control 60 can accumulate data as sub-blocks arrive from the source and write smaller sub-blocks that match the destination coherency granule size of the destination.

For a data transfer, there is a read of the resource that is the source and then a write to the destination. The command to read is preferably performed in sub-blocks of data that correspond in amount to the coherency granule size and begin at boundaries of the coherency granules. Reads cannot cross coherency granule boundaries. The individual transfers that make up a burst, called beats, occur in amounts up to the bus size and are thus smaller than the coherency granule size. A typical beat is a fourth of the coherency granule size. Thus, in this example, the coherency granule size is 32 bytes and each beat is 8 bytes. Thus, in addition to beat size, there are also beat boundaries for each full 8 byte access. The starting address, however, may be begun at a location that is not at a beat boundary. The first beat is the data from the starting address to the beat boundary. Thus, in the case where the starting address is not aligned to a beat boundary, the first beat is less than the full beat size, but future accesses, except perhaps the last beat, are of full beat sizes.

Figure 4:
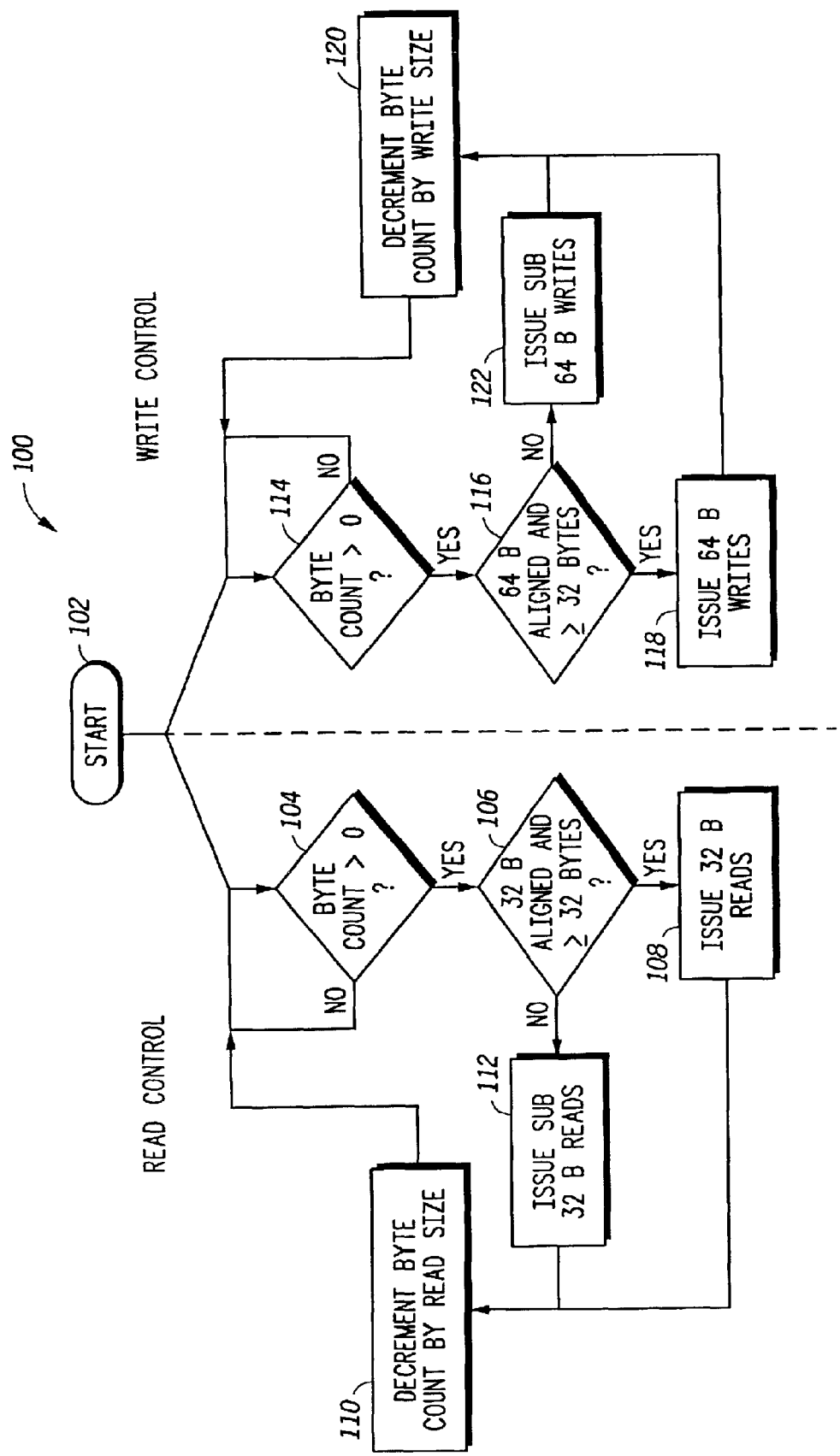
FIG. 4 is a flow diagram of the method for operating the data transfer device of FIG. 2 according to the preferred embodiment.

Shown in FIG. 4 is a flow diagram showing a method for reading and writing for the case in which the source has a 32 byte coherency granule size and the destination has a 64 byte coherency granule size. For the read, there is a step of determining if the byte count remaining to be read is greater than zero as shown in step 104. If it is greater than zero, then the next step, step 106, is to determine if the location where the read begins is aligned at a coherency granule boundary, in this case a 32 byte boundary and if the byte count remaining is greater than or equal to the coherency granule size, in this case 32 bytes. If this address is not at this 32 byte boundary, then a sub 32 byte read is performed as shown in step 112. This read returns the data from the starting address that is not aligned to the coherency granule boundary to the next coherency granule boundary. This step 112 may occur in multiple steps. The first of these multiple steps is to retrieve the first beat that may or may not be aligned to a beat boundary. When the first beat is not aligned to a beat boundary, the data from the starting address to the beat boundary is a portion of a beat that is accessed first. The remainder of the sub-block can then be obtained by a burst of the remaining beats in the sub-block. Thus, after the first sub-block is accessed it is accumulated in the buffer of the data buffer and control 60 and the byte count is decremented as shown in step 110. The process continues by ensuring the remaining byte count is greater than zero in step 104 and then a determination of the next address being coherency granule aligned, and the remaining byte count is greater than or equal to the granule size, which it should be after the first transfer has only transferred up to the coherency granule boundary. Thus, data of the coherency granule size continues being transferred until either the byte count indicates the transfer has been completed or the remaining byte count is smaller than the coherency granule size. The last transfer may be less than a full 32 bytes so that the determination in step 106 of the next transfer being 32 byte aligned and greater than or,equal to 32 bytes would be "no." So the last transfer would then be handled in a similar manner to the first transfer in that the read would not be performed as part of a burst of a coherency granule. Special transfers of that type are within the skill of one of ordinary skill in the art. Such transfers, however, are not as efficient as a transfer of a coherency granule.

For the write method the first step, step 114, is to determine if there are any bytes left to write. If the byte remaining byte count is greater than zero, which at the beginning it surely is, then there is a determination of the alignment to the coherency boundary of the destination, which in this case is 64 bytes and if the byte count remaining is greater than or equal to the coherency granule size, in this 64 bytes. For the case that the starting address is misaligned, then special handling is achieved as shown in step 122 by which a sub-64 byte write is performed. The first write begins with the data at the starting address of the destination and continues to the next coherency granule of the destination. The write is not performed until that amount of data, the data from the starting address to the 64 byte boundary in this example, has been accumulated in data buffer and control 60. After the first data transfer to the destination, subsequent transfers, except perhaps the last one, will be at coherency granule boundaries and thus data will be transferred efficiently because it will be transferred at the coherency granule size of the destination. The last transfer will, unless it ends on a coherency granule boundary, require different handling and is handled by step 122.

For a transfer of a data block, there is a read in which all but the first and last sub-blocks that make up the data block are certain to be transferred at the coherency granule size of the system at which the source resides or is coupled (source coherency granule size). This has the benefit of reading at the rate which has been optimized for the system of that source. The same is true for the transfer then to the destination. The sub-blocks, except the first and last, that are transferred to the destination are transferred at the coherency granule size of the system at which the source resides or is associated (destination coherency granule size). This has the benefit of writing at the rate that has been optimized for the system of that destination. Thus, even when the destination coherency granule size is different than the source coherency granule size, the data transfer occurs at the optimum for the read and for the write thereby maintaining the data coherency requirements for the source and destination.

Figure 5:
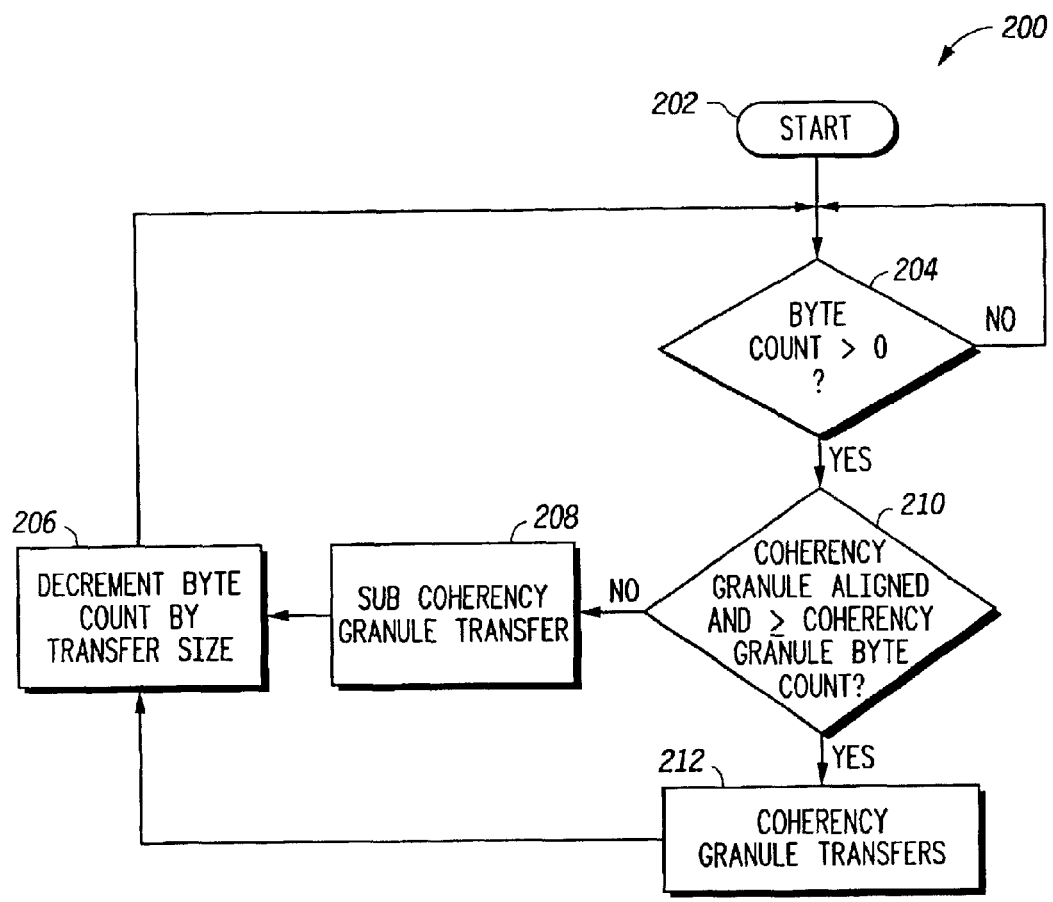
FIG. 5 is a more generalized diagram for operating the data transfer unit of FIG. 2 according to the preferred embodiment of the invention.

Shown in FIG. 5 is a more generalized flow diagram showing the principal steps for either a read or a write. The first step is to determine if there is data to be transferred by determining the byte count as shown in step 204. If the data now to be transferred is at coherency granule boundaries and the byte count remaining is greater than or equal to the coherency granule size (step 210), then there is at the next (step 212) a coherency granule transfer and the byte count is decremented. If at step 210 it is determined that the data is not at coherency granule boundaries, which will occur only at the first transfer or if the remaining byte count is smaller than the coherency granule size, which will occur only at the last transfer, then there is special handling of the transfer by a sub coherency granule transfer step 208. The special handling is not a difficult task but it does require time and is distinct from the optimized coherency granule transfers. Thus, the first and last transfers being special allows for the benefit of the rest of the transfers being of the optimized coherency granule size.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A data transfer unit (DTU) comprising:
    a first data transfer engine corresponding to a communication path between a first source and a first destination, the first data transfer engine comprising:
        source address storage circuitry for storing a source address;
        destination address storage circuitry for storing a destination address;
        source attribute storage circuitry having a coherency granule field for storing a first coherency granule corresponding to the source; and
        destination attribute storage circuitry having a coherency granule field for storing a second coherency granule corresponding to the destination.

2. The DTU of claim 1, wherein the first coherency granule is different from the second coherency granule.

3. The DTU of claim 1, wherein the DTU transfers a data block from the source to the destination.

4. The DTU of claim 3, wherein the DTU transfers a sub-block of the data block from the source, the sub-block having a size of at most the first coherency granule.

5. The DTU of claim 4, wherein the sub-block does not cross a coherency granule boundary of the source.

6. The DTU of claim 4, wherein the DTU receives a first beat corresponding to the sub-block from the source, the first beat comprising data stored at the source address, the source address corresponding to a starting address of the data block.

7. The DTU of claim 6, wherein the first beat has a beat size corresponding to at most a data transfer size of the communication path.

8. The DTU of claim 7, wherein the first beat is misaligned with a coherency granule boundary of the source, and the first sub-block is less than the first coherency granule.

9. The DTU of claim 4, wherein the DTU transfers a second sub-block of the data block to the destination, the second sub-block of data having a size of at most the second coherency granule.

10. The DTU of claim 9, wherein a portion of the first sub-block and a portion of the second sub-block are a same portion.

11. The DTU of claim 1, further comprising:
    a second data transfer engine corresponding to a communication path between a second source and a second destination, the second data transfer engine comprising:
        source address storage circuitry for storing a source address;
        destination address storage circuitry for storing a destination address;
        source attribute storage circuitry having a coherency granule field for storing a first coherency granule corresponding to the source; and
        destination attribute storage circuitry having a coherency granule field for storing a second coherency granule corresponding to the destination.

12. The DTU of claim 1, wherein the coherency granule field in the source attribute storage circuitry and the coherency granule field in the destination attribute storage circuitry are user programmable.

13. A data processor comprising the DTU of claim 1.

14. A method for transferring a data block, comprising:
    determining a first and a second coherency granule from a user programmable coherency granule field;
    determining a data block size corresponding to the data block;
    requesting a first receive sub-block of the data block from a source corresponding to the first coherency granule, wherein the first receive sub-block has a size that is at most the first coherency granule;
    receiving the first receive sub-block from the source; and
    providing a first transmit sub-block of the data block to a destination corresponding to the second coherency granule, wherein the first transmit sub-block has a size that is at most the second coherency granule, and wherein at least a portion of the first receive sub-block and a portion of the first transmit sub-block are a same portion of the data block.

15. The method of claim 14, comprising:
    after receiving the first receive sub-block from the source, requesting a second receive sub-block of the data block from the source, wherein the second receive sub-block has a size that is at most the first coherency granule; and receiving the second receive sub-block.

16. The method of claim 15, wherein the size of the second receive sub-block is equivalent to the first coherency granule.

17. The method of claim 14, comprising:

after providing the first transmit sub-block, providing a second receive transmit sub-block of the data block to the destination, wherein the second transmit sub-block size has a size that is at most the second coherency granule.

18. The method of claim 17, wherein the size of the second transmit sub-block is equivalent to the second coherency granule.

19. The method of claim 17, wherein the first receive sub-block includes the first and second transmit sub-blocks.

20. The method of claim 14, wherein the first receive sub-block is characterized as having a starting address in the source.

21. The method of claim 20, wherein if the starting address is misaligned with a first coherency granule boundary of the source, the first receive sub-block is less than the first coherency granule.

22. The method of claim 21, wherein if the starting address is misaligned with the first coherency granule boundary of the source, receiving the first receive sub-block comprises:

receiving a first beat corresponding to the first receive sub-block, the first beat comprising data stored at the starting address; and receiving subsequent remaining beats corresponding to the first receive sub-block wherein the remaining beats do not cross a second coherency granule boundary of the source.

23. The method of claim 22, wherein if the starting address is misaligned with a beat boundary of the source, the first transmit sub-block includes a portion of the first beat.

24. The method of claim 14, wherein the first transmit sub-block is characterized as having a starting address in the destination, wherein if the starting address is misaligned with a first coherency granule boundary of the destination, the first transmit sub-block is less than the second coherency granule.

25. The method of claim 24, wherein if the starting address is misaligned with a beat boundary of the destination, providing the first transmit sub-block comprises:

providing a sub-beat corresponding to the first transmit sub-block to the starting address of the destination; and providing subsequent remaining beats corresponding to the first transmit sub-block wherein the remaining beats do not cross a second coherency granule boundary of the destination.

26. A system, comprising:

a first processor having a first cache memory and a first coherency granule corresponding to the first cache memory;

a second processor having a second cache memory and a second coherency granule corresponding to second cache memory, the second coherency granule different from the first coherency granule; and a data transfer unit, coupled to the first processor and the second processor, for transferring data between the first processor and the second processor, wherein the data transfer unit comprises:

attribute storage circuitry having a first coherency granule field for storing the first coherency granule and a second coherency granule field for storing the second coherency granule.

* * * * *